US010874936B2

(12) United States Patent
Higgins et al.

(10) Patent No.: US 10,874,936 B2
(45) Date of Patent: *Dec. 29, 2020

(54) HAND-HELD CONTROLLER WITH PRESSURE-SENSING SWITCH FOR VIRTUAL-REALITY SYSTEMS

(71) Applicant: FACEBOOK TECHNOLOGIES, LLC, Menlo Park, CA (US)

(72) Inventors: Jason Andrew Higgins, Seattle, WA (US); Benjamin E. Tunberg Rogoza, Seattle, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 162 days.

This patent is subject to a terminal disclaimer.

(21) Appl. No.: 16/248,565

(22) Filed: Jan. 15, 2019

(65) Prior Publication Data

US 2019/0146582 A1 May 16, 2019

Related U.S. Application Data

(63) Continuation of application No. 15/870,631, filed on Jan. 12, 2018, now Pat. No. 10,180,720, which is a
(Continued)

(51) Int. Cl.
*A63F 13/24* (2014.01)
*A63F 13/216* (2014.01)
(Continued)

(52) U.S. Cl.
CPC .......... *A63F 13/212* (2014.09); *A63F 13/216* (2014.09); *A63F 13/218* (2014.09);
(Continued)

(58) Field of Classification Search
CPC .......... A63F 13/24; A63F 13/218; G06F 3/014
See application file for complete search history.

(56) References Cited

U.S. PATENT DOCUMENTS

| 5,008,497 A | 4/1991 | Asher |
| 5,159,159 A | 10/1992 | Asher |

(Continued)

OTHER PUBLICATIONS

"Hands-On with Sixense STEM VR Motion-Tracking System" written by Tested, accessed and printed from URL <https://www.youtube.com/watch?v=C8z-On6FBTM>, 5 pages. (Year: 2014).*

(Continued)

*Primary Examiner* — Jason Skaarup
(74) *Attorney, Agent, or Firm* — Morgan, Lewis & Bockius LLP

(57) ABSTRACT

A method is performed at a virtual-reality system that includes a head-mounted display (HMD) and a hand-held controller. The hand-held controller includes a grip, a user-input surface, and a tracking ring. the user-input surface includes a user-input key that is mounted on the grip, and the user input key includes an analog pressure sensor. The tracking ring is coupled to the user-input surface and the tracking ring includes a plurality of illumination sources on an outer surface of the tracking ring. The method displays an image of a hand on the HMD, and senses pressure applied to the analog pressure sensor by a user holding the hand-held controller and wearing the HMD. The method displays, on the HMD, the degree of closing the image of the hand in proportion to the pressure applied to the analog pressure sensor.

20 Claims, 3 Drawing Sheets

Related U.S. Application Data continuation of application No. 14/737,185, filed on Jun. 11, 2015, now Pat. No. 9,870,052.

(51) Int. Cl.

| | | |
|---|---|---|
| *A63F 13/218* | (2014.01) | |
| *A63F 13/212* | (2014.01) | |
| *G06F 3/01* | (2006.01) | |
| *G06F 3/02* | (2006.01) | |
| *G06F 3/0354* | (2013.01) | |
| *G06F 3/03* | (2006.01) | |
| *G06F 3/0346* | (2013.01) | |

(52) U.S. Cl.
CPC ............. *A63F 13/24* (2014.09); *G06F 3/014* (2013.01); *G06F 3/0202* (2013.01); *G06F 3/0227* (2013.01); *G06F 3/0325* (2013.01); *G06F 3/0346* (2013.01); *G06F 3/03547* (2013.01)

(56) References Cited

U.S. PATENT DOCUMENTS

| | | | |
|---|---|---|---|
| 5,409,239 | A | 4/1995 | Tremmel |
| 5,632,679 | A | 5/1997 | Tremmel |
| 5,855,483 | A | 1/1999 | Collins et al. |
| 6,297,811 | B1 | 10/2001 | Kent et al. |
| 6,659,870 | B2 | 12/2003 | Sobota |
| 6,661,239 | B1 | 12/2003 | Ozick |
| 6,909,354 | B2 | 6/2005 | Baker et al. |
| 8,313,379 | B2 | 11/2012 | Ikeda et al. |
| 8,496,528 | B2 | 7/2013 | Muramatsu |
| 8,823,399 | B1 | 9/2014 | Bharathan |
| 8,870,654 | B2 | 10/2014 | Nakayama et al. |
| 9,110,543 | B1 | 8/2015 | Dabell |
| 9,111,005 | B1 | 8/2015 | Ross et al. |
| 9,246,487 | B2 | 1/2016 | Casparian et al. |
| 9,678,566 | B2 | 6/2017 | Webb et al. |
| 9,753,549 | B2 | 9/2017 | Stafford et al. |
| 10,241,566 | B2 * | 3/2019 | Sawyer .............. G02B 27/0093 |
| 2001/0000888 | A1 | 5/2001 | Armstrong |
| 2001/0008848 | A1 | 7/2001 | Armstrong |
| 2002/0024503 | A1 | 2/2002 | Armstrong |
| 2002/0058549 | A1 | 5/2002 | Armstrong |
| 2003/0083131 | A1 | 5/2003 | Armstrong |
| 2006/0028434 | A1 | 2/2006 | Armstrong |
| 2006/0111180 | A1 | 5/2006 | Cheng |
| 2007/0049374 | A1 | 3/2007 | Ikeda et al. |
| 2008/0180390 | A1 | 7/2008 | Yoshikawa |
| 2010/0053151 | A1 | 3/2010 | Marti et al. |
| 2010/0245239 | A1 | 9/2010 | Sternberg |
| 2010/0253651 | A1 | 10/2010 | Day |
| 2011/0118028 | A1 | 5/2011 | Sobel |
| 2011/0205161 | A1 | 8/2011 | Myers |
| 2011/0294579 | A1 | 12/2011 | Marks et al. |
| 2012/0013571 | A1 | 1/2012 | Yeh et al. |
| 2012/0050229 | A1 | 3/2012 | Tenuta et al. |
| 2012/0193211 | A1 | 8/2012 | Cisla et al. |
| 2012/0228111 | A1 | 9/2012 | Peterson |
| 2012/0306802 | A1 | 12/2012 | McCracken |
| 2013/0141382 | A1 | 6/2013 | Simmons et al. |
| 2014/0274372 | A1 | 9/2014 | Rosander |
| 2014/0354305 | A1 | 12/2014 | Hanssen et al. |
| 2014/0354577 | A1 | 12/2014 | Hanssen et al. |
| 2015/0070604 | A1 | 3/2015 | Chen et al. |
| 2015/0153869 | A1 | 6/2015 | Kim et al. |
| 2015/0258432 | A1 | 9/2015 | Stafford et al. |
| 2015/0286334 | A1 | 10/2015 | Simmons et al. |
| 2015/0287381 | A1 | 10/2015 | Kim et al. |
| 2016/0239080 | A1 | 8/2016 | Marcolina et al. |
| 2017/0235377 | A1 | 8/2017 | Marcolina et al. |

OTHER PUBLICATIONS

"STEM System" accessed and printed from URL <http://sixense.com/wireless>, 5 pages. (Year: 2014).*

"Valve's virtual reality headset is great, but its controllers are the real story" written by Adi Robertson on Mar. 4, 2015, accessed and printed from URL <https://www.theverge.corn/2015/3/4/8150653/valve-steam-controller-vive-vr-gdc-2015>, 4 pages. (Year: 2015).*

"Valve's VR headset is called the Vive and it's made by HTC" written by Dante D'Orazio and Vlad Savov on Mar 1, 2015, accessed and printed from URL <https://www.theverge.corn/2015/3/1/8127445/htc-vive-valve-vr-headset>, 3 pages. (Year: 2015).*

"Exploring the magic behind the HTC Vive controller" written by Matt Brown on Jul. 28, 2016, accessed and printed from URL <https://www.vrheads.corn/exposing-magic-behind-htc-vive-controller>, 9 pages. (Year: 2016).*

Higgins, Notice of Allowance, U.S. Appl. No. 14/737,185, dated Sep. 11, 2017, 12 pgs.

Higgins, Notice of Allowance, U.S. Appl. No. 15/870,631, dated Aug. 31, 2018, 15 pgs.

* cited by examiner

HAND-HELD CONTROLLER WITH PRESSURE-SENSING SWITCH FOR VIRTUAL-REALITY SYSTEMS

RELATED APPLICATION

This application is a continuation of U.S. patent application Ser. No. 15/870,631, filed Jan. 12, 2018, entitled "Hand-Held Controller with Pressure-Sensing Switch for Virtual-Reality Systems," which is a continuation of U.S. application Ser. No. 14/737,185, filed Jun. 11, 2015, entitled "Hand-Held Controller with Pressure-Sensing Switch for Virtual-Reality Systems," now U.S. Pat. No. 9,870,052, each of which is incorporated by reference herein in its entirety.

TECHNICAL FIELD

This application relates generally to gaming entertainment and virtual-reality systems, and more specifically to hand-held controllers including user-input keys having switches with sensors configured to detect and distinguish between a range of pressures applied to the user-input keys.

BACKGROUND

Gaming entertainment systems typically include a hand-held controller or other controller. A user manipulates the hand-held controller to send commands or other instructions to the gaming entertainment system to control a video game or other simulation. For example, the hand-held controller may be provided with several user-input keys such as buttons or knobs operated by the user, for example a joystick.

Conventional gaming controllers typically merely provide user-input keys, e.g., buttons or knobs for manipulation by the user, where each of the buttons or knobs corresponds to a desired action to be carried out on a display of the gaming entertainment or virtual-reality system. The buttons or knobs are operated by the user applying some form of force, such as pressing, pushing or pulling the buttons or knobs in order for a desired action to be carried out.

Conventional hand-held controllers are configured such that an input provided by the user such as pushing, pulling or pressing the user-input keys corresponds to one of two states of each user-key—an on state and an off state of a switch associated with the corresponding user-input key. Therefore, manipulation of the conventional user-input keys is limited to the on or off state of the associated switches and fails to control a degree to which an action is performed (e.g., by an image subject in virtual-reality).

SUMMARY

Accordingly, there is a need for hand-held controllers having user-input keys capable of controlling a degree to which actions are performed in virtual-reality as a result of the user manipulating the user-input keys. Such hand-held controllers include switches (e.g., analog throw switches) with pressure-sensitive sensors configured to detect and distinguish between a range of pressures applied to the user-input keys, thus providing variable output representing not only on/off states of the switch, but also intermediate states of the switch.

In accordance with some embodiments, a hand-held controller for a virtual-reality system includes a grip extending from a proximal end to a distal end, and a first user-input key mounted at least in part on the grip. The first user-input key includes a casing depressible by one or more fingers of a user, and a switch coupled to the casing. The switch includes a sensor configured to detect and distinguish between a range of pressures applied to the casing.

In some embodiments, the switch comprises an analog throw switch.

In some embodiments, the analog throw switch is mounted in the casing at a position on the grip configured to be depressed by a middle finger of the user.

In some embodiments, the first user-input key comprises a trigger.

In some embodiments, the sensor comprises an analog pressure-sensitive sensor to sense pressures applied to the casing of the first user-input key. The sensed pressures are within the range of pressures.

In some embodiments, the casing is positioned within a recess of the grip and the switch is positioned in the casing.

In some embodiments, increased pressure applied to the first user-input key corresponds to a closing of the user's hand in virtual-reality and decreased pressure applied to the first user-input key corresponds to an opening of the user's hand in virtual-reality.

In some embodiments, the hand-held controller further includes a user-input surface including a second user-input key. The grip is coupled to and extends at an angle from the user-input surface.

In some embodiments, the hand-held controller further includes a cage coupled to the user-input surface and having an outer surface. The cage includes a plurality of illumination sources on the outer surface.

In some embodiments, the hand-held controller further includes a structural web coupling the cage to the user-input surface.

In some embodiments, the first user-input key is further mounted at least in part on the structural web.

In some embodiments, the plurality of illumination sources comprises a plurality of light-emitting diodes (LEDs).

In some embodiments, the hand-held controller further includes a power source to supply power to the user-input surface, the switch and the plurality of LEDs.

In some embodiments, the plurality of illumination sources comprises a plurality of passive reflectors.

In some embodiments, the cage is detachably coupled to at least one of the user-input surface and the grip.

In some embodiments, the user-input surface forms an inner front surface of the cage.

In some embodiments, the user-input surface comprises a plurality of user-input keys including the second user-input key. Respective user-input keys of the plurality of user-input keys are selected from the group consisting of a thumbstick, a button, a trigger, and a directional pad.

In some embodiments, the first user-input key is selected from the group consisting of a button and a trigger.

In accordance with some embodiments, a hand-held controller for a virtual-reality system includes a user-input surface, a grip extending at an angle from the user-input surface, and a first user-input key mounted at least in part on the grip. The first user-input key includes a casing positioned within a recess of the grip and depressible by one or more fingers of a user, and an analog throw switch mounted in the casing. The analog throw switch includes an analog pressure-sensitive sensor configured to sense and distinguish a range of pressures applied to the first user-input key. The hand-held controller also includes a second user-input key situated on the user-input surface, and a cage coupled to the user-input surface. The cage includes a plurality of illumination sources on an outer surface of the cage. The hand-held controller additionally includes a structural web coupling the cage to the user-input surface, and a power source configured to supply power to the user-input surface, the analog throw switch and the cage.

In some embodiments, increased pressure applied to the first user-input key corresponds to a closing of the user's hand in virtual-reality and decreased pressure applied to the first user-input key corresponds to an opening of the user's hand in virtual-reality.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DETAILED DESCRIPTION

Figure 1:
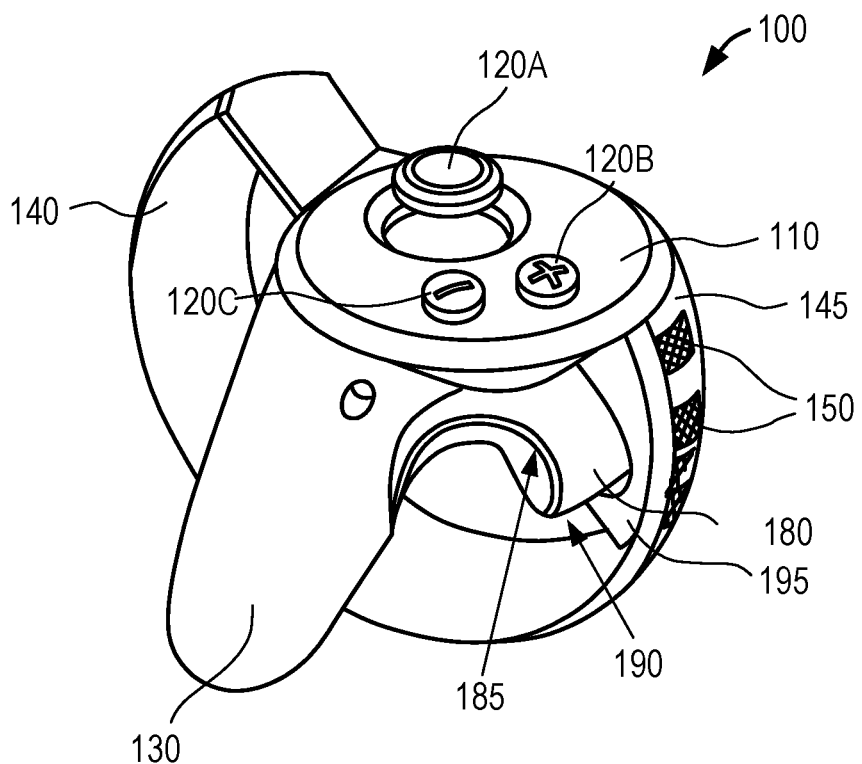
FIG. 1 illustrates an isometric view of an exemplary hand-held controller in accordance with some embodiments.

The present disclosure describes hand-held controllers having at least one user-input key including a switch to detect and distinguish between a range of pressures applied to the user-input key(s). For example, an analog throw switch has a pressure-sensitive analog sensor configured to sense pressures within the range that are applied to a corresponding user-input key. In some embodiments, a sensing of an increased pressure applied to the user-input key corresponds to a motion in virtual-reality of an image subject closing their hand (e.g., clenching fingers into a fist). A sensing of a reduced pressure applied to the user-input key (i.e., a user releasing the user-input key) corresponds to an opening of the image subject's hand in virtual-reality (e.g., unclenching the fist). The analog throw switch is thus configured to detect and distinguish between a range of pressures applied to the user-input, thereby controlling the degree to which an action is performed (e.g., degree of opening or closing of the user's hands to be modeled and performed in virtual-reality).

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first user-input key could be termed a second user-input key, and, similarly, a second user-input key could be termed a first user-input key, without departing from the scope of the various described embodiments. The first user-input key and the second user-input key are both user-input keys, but they are not the same user-input key.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

Figure 2:
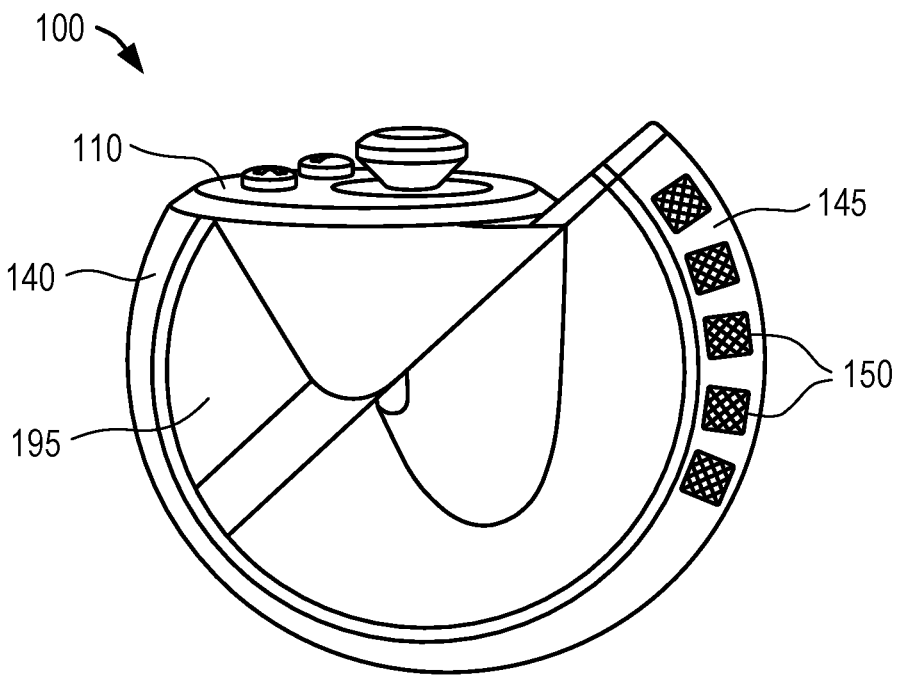
FIG. 2 illustrates another isometric view of the exemplary hand-held controller in accordance with some embodiments.

FIG. 1 and FIG. 2 illustrate a hand-held controller 100 in accordance with some embodiments. The hand-held controller 100 generally comprises a grip 130 extending from a proximal end to a distal end, and a first user-input key 190 (e.g., a trigger) mounted partially on the grip 130. (Alternatively, the first user-input key 190 is mounted entirely on the grip 130.) The first user-input key 190 is mounted at a position on the grip 130 between the proximal and distal ends configured for easy access by one or more fingers of the user. The first user-input key 190 comprises a casing 180 which is depressible by the one or more fingers of the user and a switch 185 coupled to the casing 180. In some embodiments, the switch 185 includes a sensor 187 (shown in FIG. 3) configured to detect and distinguish between a range of pressures applied to the casing 185.

Figure 3:
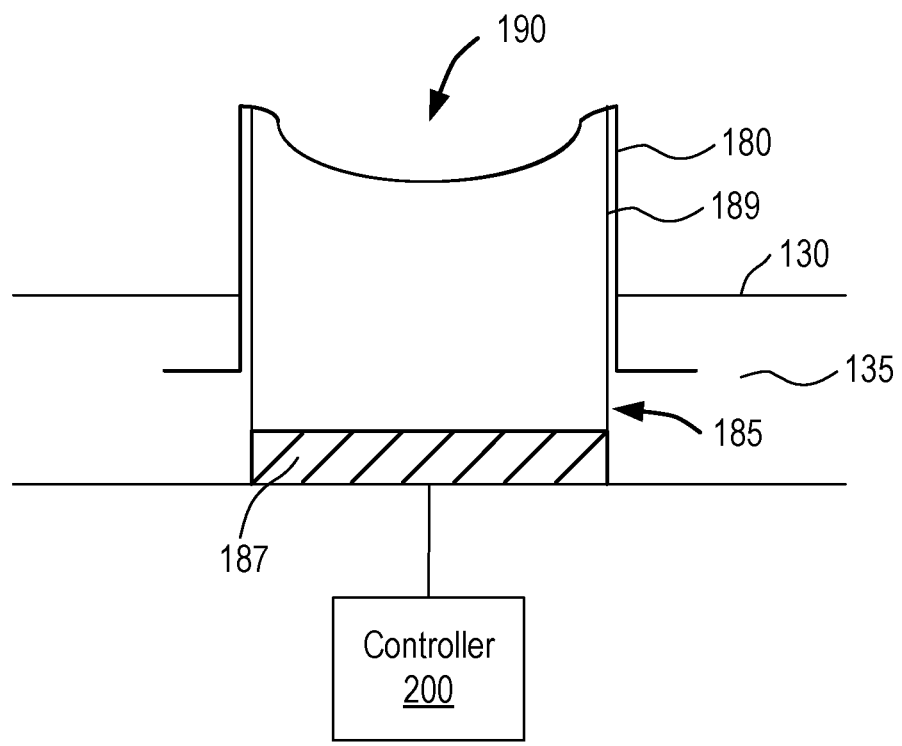
FIG. 3 illustrates a cross-sectional view of a user-input key with an analog throw switch in accordance with some embodiments.

FIG. 3 illustrates a cross-sectional view of a user-input key (e.g., the first user-input key 190) with an analog throw switch in accordance with some embodiments. In some embodiments, the casing 180 is positioned within a recess 135 of the grip so as to be depressible and retractable within the recess 135 as the user's finger(s) apply pressure to the first user-input key 190. The casing 180 may be configured with a concave shape so as to provide an outer surface with a concave geometry matching the curvature of the user's fingers, thereby providing ease of gripping the first user-input key 190. In other embodiments, the casing 180 may alternatively be configured with a convex shape where a portion of the outer surface of the casing 180 protrudes outwards from the grip towards the user's hand. The switch 185 is positioned in the casing and coupled to the casing so as to be depressed and retract proportionally with the first-user input key 190 when the user applies pressure to the casing 180 to activate the first user-input key 190.

In some embodiments, the first user-input key 190 and the grip 130 are each formed of a rubber material or a hard plastic material. The grip 130 and/or the first user-input key 190 may be formed of an over-molded rubber material so as to have a surface providing sufficient friction with the user's palm and finger(s) thus improving the grip. In some embodiments, the grip 130 and/or the first user-input key 190 may be formed of a hard plastic, including, but not limited to high density polyethylene providing increased rigidity in structure. Additionally, any other suitable materials may be used. In some embodiments, the first user-input key 190 is selected from the group consisting of a button and a trigger.

In some embodiments, the switch 187 comprises an analog throw switch (e.g., an analog long-throw switch). The analog throw switch may be configured with an elastic switch arm 189 which contacts an inner surface of the casing 180 and compresses in one direction proportionally to the extent of depression of the casing 180 when pressure is applied to the first user-input key 190 by the user's finger(s). The elastic switch arm 189 is configured to correspondingly expand, in a direction opposite to that of the compression and in proportion to the extent of rising back towards the un-depressed position of the first user-input key 190, when the pressure is released from the first user-input key 190 as the user loosens and/or releases a grip of the finger(s) on the casing 180. The pressure provided by the user's finger(s) on the first user-input key 190 thus pushes the switch arm 189 in one direction as applied pressure increases. As the pressure is reduced or released the switch arm 189 reverts back in the opposite direction towards the original un-depressed state. In some embodiments the switch arm 189 may include a spring capable of resiliently compressing and expanding in response to the application and release of pressure to the first user-input key 190 by the user.

In other embodiments, the analog throw switch may include the sensor 187 without the elastic switch arm 189. In these embodiments, the sensor may be configured of a conductive material such as copper coupled to a rubber material, a spring material, or any other suitable elastic material capable of resiliently compressing and expanding in response to the application and release of pressure to the first user-input key 190 by the user.

In some embodiments, the analog throw switch 185 comprises, but is not limited to an analog single-throw switch or an analog dual-throw switch responsive to pressure applied to the first user-input key 190 depending on a number of first user-input keys 190 and on a number of hand-held controller circuits. The switch arm 189 is configured to compress proportionally to the pressure applied to the casing 180 and configured to transfer the pressure to an adjacent surface of the sensor 187. Given this configuration, the analog throw switch 185 allows a user to determine more than simple presence or absence of pressure on the user-input surface as a traditional on-off switch does. The analog throw switch 185 provides an analog output signal to the controller 200 which is proportional to the pressure between the sensor 187 and the casing of the first user-input key 190.

In some embodiments, the analog throw switch 185 is mounted in the casing 180 at a position on the grip configured to be depressed by a middle finger of the user.

In some embodiments, the sensor 187 comprises an analog pressure-sensitive sensor to sense pressures applied to the casing 180 of the first user-input key 190. The analog pressure-sensitive sensor 187 is configured to measure a range of pressures from a first threshold pressure, e.g., zero, corresponding to a position where the first user-input key 190 is in an un-depressed (i.e. raised) state to a second threshold pressure corresponding to a position where the first user-input key 190 is in a fully depressed state. The analog pressure-sensitive sensor is configured to receive a range of pressure inputs applied by the user's finger(s) and for each pressure input to provide an analog output proportional to the sensed pressure provided by user's finger(s) depressing or releasing the casing 180. In some embodiments, the analog pressure-sensitive sensor 187 is configured with a transducer to convert each sensed pressure input into an analog electrical signal and output the analog electrical signal to a controller for display as an action of the image subject in virtual-reality.

In some embodiments, the analog pressure-sensitive sensor 187 may be configured of any one or any combination of materials selected form the group comprising of copper, carbon, manganese, silicon, chromium, nickel, phosphorus, tungsten, magnesium, tin, sulfur and iron.

In some embodiments, sensor 187 may be a displacement sensor configured to sense a range of positions of the first-user input key 190 from a first threshold position where the first user-input key 190 is in an original un-depressed state up to a second threshold position corresponding to a position where the first user-input key 190 is in a fully depressed state. The displacement sensor 187 is configured to sense a change in position of the first-user input key 190 as the first user-input key 190 is being depressed or released. The displacement sensor 187 is configured to receive a series of positions of the first user-input key 190 as inputs and for each consecutive pair of position inputs to provide an analog output proportional to the sensed displacement of the first user-input key 190 as a result of the user's finger(s) depressing or releasing the casing 180. In some embodiments, the displacement sensor is configured with a transducer to convert each input into an analog electrical signal and output the analog electrical signal to a controller for display as an action of the image subject in virtual-reality.

In some embodiments, increased pressure applied to the first user-input key 190 corresponds to a closing of the user's hand in virtual-reality and decreased pressure applied to the first user-input key 190 corresponds to an opening of the user's hand in virtual-reality. For example, when the user depresses the first-user input key 190 from the initial un-depressed state, the analog pressure-sensitive sensor 187 senses an increase in pressure and a mechanical force corresponding to the input pressure is converted by the sensor to an electrical signal which is then output to the controller 200. The controller 200 of the hand-held controller 100 is configured to communicate with a display and/or processor of the virtual-reality system to display a degree of closing of the hand of the image subject in virtual-reality in proportion to the pressure applied. That is, if the user applies a pressure equal to the second threshold pressure from an initial un-depressed position of the first user-input key 190, the image subject is displayed as completely closing an initially open hand.

When the user subsequently releases the first-user input key 190 from the fully depressed state, the analog pressure-sensitive sensor 187 senses a decrease in pressure and a mechanical force corresponding to the reduced pressure is converted by the sensor to an electrical signal which is then output to the controller 200. The controller 200 of the hand-held controller 100 is configured to communicate with the display and/or processor of the virtual-reality system to display a degree of opening of the hand of the image subject in virtual-reality in proportion to the pressure applied. For example, if the user reduces the pressure applied to an amount in between the first and second threshold pressure values, thereby allowing the first user-input key 190 to be raised in position (e.g., towards the outer surface of the grip), the image subject is displayed as partially opening the hand from the aforementioned completely closed position. Similarly, if the user reduces the pressure applied up to the first threshold value (e.g., zero) the image subject is displayed as fully opening the hand.

The state of the analog throw switch 185 thus represents opening and closing of the hand of an image subject in virtual-reality. By gripping or letting go of the switch, opening or closing of the hand of the image subject may be simulated in the virtual environment. This provides the advantage of allowing intermediate states of the analog throw switch to be represented as partial opening or closing of the hand of the image subject, in contrast to a simple momentary on-off switch, which cannot represent partial opening or closing of the hand.

In some embodiments, the hand-held controller 100 further comprises a user-input surface including a second user-input key 120A. The grip 130 is coupled at the proximal end to the user-input surface 110 and extends from the proximal end to the distal end at an angle from the user-input surface 110. In some embodiments, the second user-input key 120A may be selected from the group consisting of a thumb stick, a button, a trigger, and a directional pad.

In some embodiments, the user-input surface 110 comprises a plurality of user-input keys 120B, and 120C in addition to the second user-input key 120A. The respective user-input keys of the plurality of user-input keys 120A, 120B, and 120C are selected from the group consisting of a thumb stick, a button, a trigger, and a directional pad.

The user-input keys 120A, 120B, 120C are buttons, knobs, switches, thumbsticks, directional pads, or any other such part that a user manipulates in some way to carry out a specific action in a virtual-reality system (e.g., during gaming). In the example of FIG. 1 and FIG. 2, the user input keys 120A, 120B and 120C include a thumbstick 120A and buttons 120B and 120C. Thus, the user-input surface 110 is a surface on the controller where the user delivers an input by activating one or more of the user-input keys (e.g. by pressing, pushing or pulling the user-input keys 120A, 120B, and 120C) corresponding to an action that the user desires to carry out in the virtual-reality system.

Each of the user-input keys 120A, 120B, and 120C is configured to communicate with the virtual-reality system so as to translate an operation of the user-input keys 120A, 120B and 120C by the user into a corresponding action in the virtual-reality environment.

In some embodiments, the user-input keys 120B and/or 120C may be selected from the group consisting of an A or X button, a B or Y button, a start button, a back button, a forward button, and a home button. The A or B buttons may correspond to a selection action between at least two choices presented to the user in the gaming system. The X or Y button may correspond to a negative or affirmative decision to be made by the user dictating how the image subject will proceed in the game. X may correspond to an action of "NO" or "END" and Y may correspond to "YES" or "PROCEED/CONTINUE." The start button may be a button activated by the user to begin the virtual-reality (e.g., gaming) experience, and the back and forward buttons may indicate a direction in which the user desires the image subject to move. The home button may be a button activated to return the gaming experience back to a main menu or to start the game or activity from the beginning.

In some embodiments, the home button is positioned further away from the other user-input keys. This configuration would allow for user-input keys that are used most (e.g. a directional pad used to dictate a direction of movement of the image subject, e.g., up-down-left-right) to be placed closer to the vicinity of the fingers and thumb. This configuration provides the advantage that the user would not need to overreach fingers to activate the more frequently used user-input keys, thereby mitigating the possibility of ergonomic ailments associated with overreaching and overstretching fingers.

In some embodiments, the grip 130 is coupled to the user-input surface 110. The grip 130 is the protruding structure of the hand-held controller 100 which the user grips in one hand to hold the hand-held controller 100. This configuration allows for the user to be able to grip the hand-held controller 100 between a palm and fingers (e.g., three or less fingers) while freeing up the thumb and, in some embodiments, another finger (e.g. the middle finger), for operating the user-input keys 120A, 120B and 120C. In some embodiments, the middle finger is freed to operate the first user-input key 190 mounted at least in part on the grip 130.

In some embodiments the grip 130 is a separate part of the hand-held controller 100 that is removably coupled to the user input surface 110 and/or cage 140. The grip 130 and the user-input surface 110 may be coupled by a method appropriate for their materials of construction. For example, the grip 130 and user-input surface 110 may be formed of a hard plastic and may be coupled to each other by ultrasonic welding. Alternatively, the grip 130 and the user-input surface 110 may be coupled to each other by a fastening mechanism such as a screw or a bolt, or may be threadedly engaged with each other.

In some embodiments, the grip 130 is slanted at a predetermined angle with respect to the user-input surface 110 (e.g., with a plane through the user-input surface or a portion thereof) in order to provide a comfortable (e.g., optimum) ergonomic balance for a user between holding the grip in and using a thumb to operate the at least one user-input key.

In some embodiments, the hand-held controller 100 further comprises a cage 140 (FIGS. 1 and 2) coupled to the user-input surface 110. In some embodiments, the grip 130 is integrally formed with the user-input surface 110 and/or the cage 140, as one part (e.g., which may be formed from molding).

In some embodiments, the cage 140, which may also be referred to as a tracking cage, includes an outer surface 145 on which a plurality of illumination sources 150 is positioned. The illumination sources 150 are configured to be positioned to be visible to an external image-capturing device (e.g., camera), which detects movement of the illumination sources 150 when the user makes a motion (e.g., waving, swinging, punching, shaking, or any other hand motion) while holding the grip 130 of the controller 100. In some embodiments, the cage 140 is positioned such that it is located above the user hand when the user holds the grip 130 in a neutral position. Given this orientation, the outer surface 145 is configured to be visible to the image-capturing device (e.g., a forward-looking camera on a head-mounted display worn by the user, or alternatively an external camera separate from the head-mounted display). A neutral position refers to when users hold the controller 100 in front of them with the grip 130 between palm and fingers and otherwise relax their arms and wrists.

In some embodiments, the illumination sources 150 are light emitting diodes (LEDs). In some embodiments, the LEDs are infrared (IR) LEDs. The LEDs may be positioned on the outer surface 145 of the cage 140 in any suitable pattern, order, or array. For example, LEDs may be positioned linearly, in a circular pattern, a rectangular pattern, a hexagonal pattern, or any other desired pattern to provide visibility to the image capture device. The LEDs may be fixedly or detachably positioned on the cage 140 by any appropriate method. For example, the LEDs may be mounted on or embedded within the outer surface 145 of the cage 140. Alternatively, the LEDs may be on a sleeve that surrounds the cage 140 and effectively forms the outer surface 145 of the cage 140. Although the LEDs are described as being positioned on the outer surface 145 of the cage 140, they may additionally or alternatively be coupled to any other surface on the cage 140 and/or the rest of the controller 100. Additionally, the illumination sources 150 may be another type of illumination source (e.g., passive reflectors configured to reflect light provided by the camera back to the camera for detection of positions of the passive reflectors).

The LEDs are electrically connected to a power source which may or may not be same power source providing power to at least one of (e.g., to all of) the user-input surface 110 and the switch 185 including the sensor 187. The hand-held controller 100 may be wireless; therefore, the power source may be one or more batteries. The LEDs may be housed in diffused cases including a current limiting resistor to keep the current from the power source to the LED below the LEDs maximum current rating so as to ensure maximum life of the LEDs. The LEDs may be activated when a suitable voltage is applied. By virtue of the LEDs being configured to be positioned in an area on the hand-held controller 100 detectable to the image capture device, motion of the light produced by the LEDs that is detected by the image capture device is used as an indication of the positions and motion of the hand-held controller 100. In this way, motion of the hand-held controller 100 is tracked by the image capture device, allowing for corresponding virtual-reality hand motions to be shown. For example, when the user makes a punching motion while playing a boxing game, movement of the LEDs in a manner corresponding to a punch may be detected and used to model the user's motion in virtual-reality.

In the example of FIG. 1 and FIG. 2, the user-input surface 110 is outward-facing with respect to the cage 140. Alternatively, the user-input surface 110 may be inward-facing with respect to the cage 140. For example, in some embodiments the user-input surface 110 forms an inner front surface of the cage 140 or is contiguous with the inner surface of the cage 140.

In some embodiments, the cage 140 may be formed of an over-molded rubber material or the cage 140 or may be formed of a hard plastic, including, but not limited to high density polyethylene providing increased rigidity in structure. Additionally, any other suitable materials may be used.

In some embodiments, the cage 140 may be detachably coupled to at least one of the user-input surface 110 and the grip 130. The cage 140 may be slidably coupled to the user-input surface 110 through a protrusion spanning a width of each end portion of the cage 140 being slidably engaged with a corresponding groove positioned on an outer circumference of the user-input surface 110. The cage 140 may be coupled to the grip 130 through a fastening mechanism such as a bolt, a screw or the like. The detachable configuration of the cage 140 to the grip 130 or the user-input surface 110 yields the advantage of separating the aforementioned components for calibration as necessary. Detachable coupling of the components also allows for a separate and potentially cheaper manufacturing process of the parts. Furthermore, detachable coupling of the cage 140 to at least one of the user-input surface 110 and the grip 130 allows for separation thereof upon dropping of the hand-held controller 100, thereby reducing the need to replace the entire unit upon damage, but instead focus on fixing/replacing the separate damaged part.

In some embodiments, as illustrated in FIG. 1 and FIG. 2, the hand-held controller 100 may further comprise a structural web 195 coupling the cage 140 to the user-input surface 110. The structural web 195 provides further rigidity in structure to the coupling between the cage 140 and the user-input surface 110 to mitigate damage and separation of these components upon dropping of the hand-held controller 100 by the user.

In some embodiments, the first user-input key 190 is a trigger mounted at least in part on the structural web 195. That is, the trigger 190 may be mounted between the structural web 190 and the grip 130. This configuration yields the advantage that the trigger is positioned adjacent to a location of a user's finger (e.g., middle finger) when the grip 130 is held in the neutral position.

According to some embodiments, a hand-held controller 100 for a virtual-reality system comprises a user-input surface 110, a grip 130 extending at an angle from the user-input surface 110, and a first user-input key 190 mounted at least in part on the grip 130. The first user-input key 190 comprises a casing 180 positioned within a recess 135 of the grip 130 and depressible by one or more fingers of a user, and an analog throw switch 185 mounted in the casing 180. The analog throw switch 185 comprises an analog pressure-sensitive sensor 187 configured to sense and distinguish a range of pressures applied to the first user-input key 190. The hand-held controller 100 further comprises a second user-input key 120A situated on the user-input surface 110 and a cage 140 coupled to the user-input surface 110. The cage 140 includes a plurality of illumination sources 150 on an outer surface 145 of the cage 140. The hand-held controller 100 further comprises a structural web 195 coupling the cage 140 to the user-input surface 110, and a power source configured to supply power to the user-input surface 110, the analog throw switch 185 and the cage 140.

In some embodiments, increased pressure applied to the first user-input key 190 corresponds to a closing of the user's hand in virtual-reality and decreased pressure applied to the first user-input key 190 corresponds to an opening of the user's hand in virtual-reality, as described previously in this disclosure.

Figure 4:
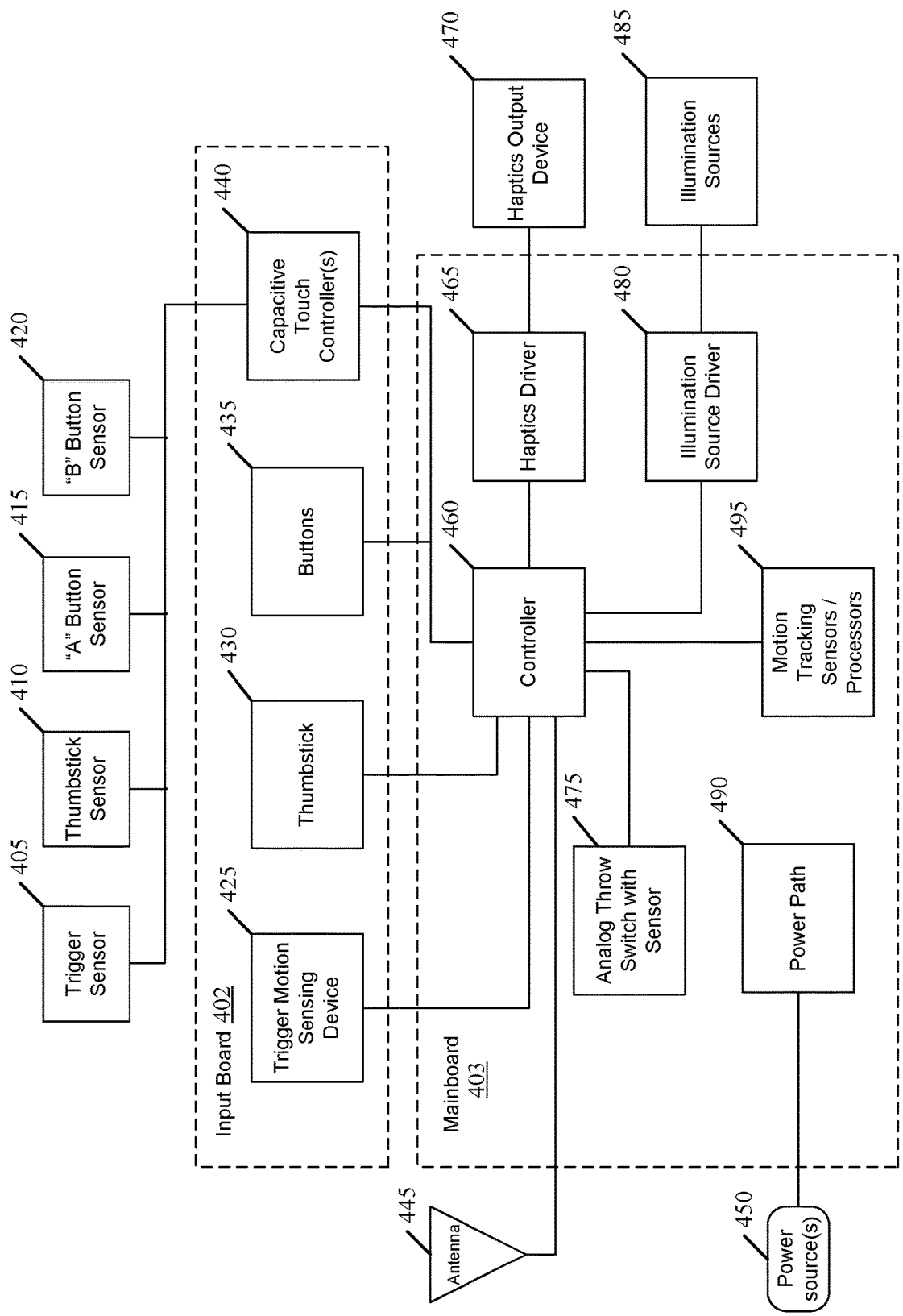
FIG. 4 is a block diagram illustrating an electrical configuration of the exemplary hand-held controller having at least one user-input key with an analog throw switch in accordance with some embodiments.

FIG. 4 is a block diagram illustrating an electrical configuration of an exemplary hand-held controller (e.g., hand-held controller 100) having at least one user-input key 190 with an analog throw switch 185 in accordance with some embodiments. The hand-held controller includes an input board 402 and a main board 403 coupled to the input board 402. The input board 402 includes a trigger motion sensing device 425, a thumbstick 430, buttons 435, and a capacitive touch controller 440. In other examples, the input board 402 may include additional or alternative user-input keys. The trigger motion sensing device 425 detects user activation of a trigger (e.g., trigger 190).

The capacitive touch controller 440 is coupled to multiple sensors 405, 410, 415, and 420 such that the input board 402 receives sensed signals from the sensors resulting from a user's finger manipulating a portion (e.g. user-input surface 110, and/or user input-keys 120A, 120B, 120C, and 190) of the hand-held controller 100. For example, the sensors include a trigger sensor 405, a thumbstick sensor 410, an "A" button sensor 415, and/or a "B" button sensor 420. For example, the trigger sensor 405 may sense when a user manipulates the trigger. Similarly, the thumbstick sensor 410 senses a signal resulting from the user manipulating the manipulating the buttons 415 and 420. Other capacitive sensors may be included for other user-input keys (e.g., a directional pad).

The mainboard 403 includes a controller 460 (e.g., the controller 200, FIG. 3), a haptics driver 465, an analog throw switch with sensor 475 (e.g., the switch 185), power path 490, motion tracking sensors/processors 495 and an illumination source driver 480. The haptics driver 465 drives a haptics output device 470 that provides haptic effects. An example of the haptics output device 470 includes a short vibration feedback device that, when activated, causes the hand-held controller to vibrate. Additionally, the haptics device may be configured for use with the capacitive touch sensors, thereby providing a vibration feedback to the user of the determined location of the user's finger corresponding to a desired action to be carried out in virtual-reality.

The mainboard 403 may be coupled to an antenna to wirelessly receive and transmit signals. The hand-held controller (e.g., hand-held controller 100) thus may be wireless. The mainboard 403 may also be coupled to a power source 450 to provide power supply to the controller 460. The power may be supplied to the mainboard 403 through a power path 490.

The illumination source driver 480 (e.g., LED driver) drives illumination sources 485 (e.g., LEDs on the outer surface of the cage 140) under the control of the controller 460, and thus turns the illumination sources 485 on or off.

The analog throw switch with sensor 475 is configured to detect and distinguish between a range of pressures applied to the first user-input key (e.g. when a user activates the trigger 190) and this information is processed by the controller 460. The motion tracking sensors/processors 495 include a plurality of motion sensors (e.g. accelerometers and/or gyroscopes) which tracks motion of the hand-held controller based on motions made by the user.

Some embodiments are directed to two hand-held controllers—one to be held in each of a user's hands. In some embodiments, the two hand-held controllers may be identical, but for a position of at least one of the user-input keys, so as to be adapted specifically for either a left or right hand in which the hand-held controller is to be held. The first hand-held controller thus may be a right-handed controller and the second hand-held controller may be a left-handed controller. In other embodiments, the two hand-held controllers may be agnostic with respect to handedness (e.g., with both hand-held controllers having the same configuration of user-input keys, or with one hand-held controller having a configuration of user-input keys different than the other).

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
in a virtual-reality system comprising a head-mounted display (HMD) and a hand-held controller, wherein:
the hand-held controller comprises a grip, a user-input surface, and a tracking ring;
the user-input surface includes a user-input key that is mounted, at least in part, on the grip, and the user input key includes an analog pressure sensor; and
the tracking ring is coupled to the user-input surface and the tracking ring includes a plurality of illumination sources on an outer surface of the tracking ring;
the method comprising:
displaying an image of a hand on the HMD;
sensing pressure applied to the analog pressure sensor by a user holding the hand-held controller and wearing the HMD; and
displaying, on the HMD, a degree of closing of the image of the hand in proportion to the pressure applied to the analog pressure sensor.

2. The method of claim 1, wherein:
sensing the pressure applied to the analog pressure sensor comprises sensing increased pressure being applied to the analog pressure sensor; and
the displaying comprises displaying an animation of the image of the hand at least partially closing, in accordance with the increased pressure.

3. The method of claim 2, wherein:
the increased pressure causes the user-input key to partially depress; and
the animation shows the image of the hand partially closing.

4. The method of claim 2, wherein:
the increased pressure causes the user-input key to fully depress; and
the animation shows the image of the hand fully closing.

5. The method of claim 1, wherein:
sensing the pressure applied to the analog pressure sensor comprises sensing reduced pressure being applied to the analog pressure sensor; and
the displaying comprises displaying an animation of the image of the hand at least partially opening, in accordance with the reduced pressure.

6. The method of claim 5, wherein:
the reduced pressure causes the user-input key to partially release from a fully depressed state; and
the animation shows the image of the hand partially opening.

7. The method of claim 5, wherein:
the reduced pressure causes the user-input key to fully release from a fully depressed state; and
the animation shows the image of the hand fully opening.

8. The method of claim 1, further comprising, in the virtual-reality system, at respective times:
determining that the pressure applied to the analog pressure sensor corresponds to a first threshold pressure;
determining that the pressure applied to the analog pressure sensor corresponds to a second threshold pressure greater than the first threshold pressure; and
determining that the pressure applied to the analog pressure sensor is between the first threshold pressure and the second threshold pressure;
wherein the displaying comprises:
in response to determining that the pressure applied to the analog pressure sensor corresponds to the first threshold pressure, displaying the image of the hand as fully open on the HMD;
in response to determining that the pressure applied to the analog pressure sensor corresponds to the second threshold pressure, displaying the image of the hand as fully closed on the HMD; and
in response to determining that the pressure applied to the analog pressure sensor is between the first threshold pressure and the second threshold pressure, displaying the image of the hand as partially open.

9. The method of claim 8, wherein:
the first threshold pressure is zero pressure on the analog pressure sensor; and
the second threshold pressure corresponds to the user-input key being fully depressed.

10. The method of claim 1, wherein:
the user-input key comprises:
a casing depressible by one or more fingers of the user; and
a switch coupled to the casing, wherein the switch includes the analog pressure sensor.

11. The method of claim 10, wherein sensing the pressure applied to the analog pressure sensor comprises detecting a range of pressure inputs applied to the casing by the user.

12. The method of claim 11, wherein:
the virtual-reality system comprises a controller, distinct from the hand-held controller, to control the HMD;
the analog pressure sensor comprises a transducer; and
the method further comprises, in the virtual-reality system:
converting the pressure inputs into respective analog electrical signals, using the transducer; and
providing the respective analog electrical signals to the controller for display as actions of the image of the hand.

13. The method of claim 10, wherein the user-input key comprises a trigger.

14. The method of claim 10, wherein:
the casing is positioned within a recess of the grip; and
the switch is positioned in the casing.

15. A virtual-reality system, comprising:
a head-mounted display (HMD); and
a hand-held controller, wherein:
the hand-held controller comprises a grip, a user-input surface, and a tracking ring;
the user-input surface includes a user-input key that is mounted, at least in part, on the grip, wherein the user input key includes an analog pressure sensor;
the tracking ring is coupled to the user-input surface and the tracking ring includes a plurality of illumination sources on an outer surface of the tracking ring; and
the hand-held controller is configured to:
display an image of a hand on the HMD;
sense pressure applied to the analog pressure sensor by a user holding the hand-held controller and wearing the HMD; and
display, on the HMD, a degree of closing of the image of the hand in proportion to the pressure applied to the analog pressure sensor.

16. The system of claim 15, wherein:
sensing the pressure applied to the analog pressure sensor comprises sensing increased pressure being applied to the analog pressure sensor; and
the displaying comprises displaying an animation of the image of the hand at least partially closing, in accordance with the increased pressure.

17. The system of claim 15, wherein:
sensing the pressure applied to the analog pressure sensor comprises sensing reduced pressure being applied to the analog pressure sensor; and
the displaying comprises displaying an animation of the image of the hand at least partially opening, in accordance with the reduced pressure.

18. The system of claim 15, wherein the hand-held controller is further configured to, at respective times:
determine that the pressure applied to the analog pressure sensor corresponds to a first threshold pressure;
determine that the pressure applied to the analog pressure sensor corresponds to a second threshold pressure greater than the first threshold pressure; and
determine that the pressure applied to the analog pressure sensor is between the first threshold pressure and the second threshold pressure;
wherein the displaying comprises:
in response to determining that the pressure applied to the analog pressure sensor corresponds to the first threshold pressure, displaying the image of the hand as fully open on the HMD;
in response to determining that the pressure applied to the analog pressure sensor corresponds to the second threshold pressure, displaying the image of the hand as fully closed on the HMD; and
in response to determining that the pressure applied to the analog pressure sensor is between the first threshold pressure and the second threshold pressure, displaying the image of the hand as partially open.

19. The system of claim 15, wherein:
the user-input key comprises:
a casing depressible by one or more fingers of the user; and
a switch coupled to the casing, wherein the switch includes the analog pressure sensor.

20. The system of claim 15, wherein:
the virtual-reality system comprises a controller, distinct from the hand-held controller, to control the HMD;
the analog pressure sensor comprises a transducer; and
the hand-held controller is further configured to:
convert the pressure inputs into respective analog electrical signals, using the transducer; and
provide the respective analog electrical signals to the controller for display as actions of the image of the hand.

* * * * *